Feb. 1, 1966 F. P. SMITH 2ND 3,233,192
INDEPENDENT MULTI-OVERTONE OPERATION OF ELECTRO-MECHANICALLY
FREQUENCY CONTROLLED OSCILLATORS
Filed Sept. 20, 1963 2 Sheets-Sheet 1

INVENTOR.
Frank Patterson Smith, 2ND
BY
Paul & Paul
ATTORNEYS.

INDEPENDENT MULTI-OVERTONE OPERATION OF ELECTRO-MECHANICALLY FREQUENCY CONTROLLED OSCILLATORS

Filed Sept. 20, 1963 2 Sheets-Sheet 2

INVENTOR.
*Frank Patterson Smith, 2ND*
BY
*Paul & Paul*
ATTORNEYS.

United States Patent Office 3,233,192

Patented Feb. 1, 1966

3,233,192

INDEPENDENT MULTI-OVERTONE OPERATION OF ELECTRO-MECHANICALLY FREQUENCY CONTROLLED OSCILLATORS

Frank Patterson Smith, 2nd, Ambler, Pa., assignor to National Aeronautical Corporation, Fort Washington, Pa., a corporation of Pennsylvania Filed Sept. 20, 1963, Ser. No. 310,378
2 Claims. (Cl. 331—161)

This invention relates to electro-mechanically controlled oscillators. An important example of an electro-mechanical device for controlling the frequency of operation of an oscillator is a piezo-electric crystal, and it will be convenient throughout the description to refer to crystal controlled oscillators. However, the invention also contemplates the use of other devices such as ceramic or magneto-strictive devices having mode or overtone properties, for controlling the oscillation frequency.

An object of the present invention is to provide an oscillation system in which a single two-electrode piezo-electric crystal simultaneously controls two oscillators operating at widely different frequencies and in which the operation of one oscillator does not significantly affect the operation of the other.

The present invention is particularly suited for multi-channel crystal controlled equipment in which a plurality of crystals are employed and in which signals from two different crystal-controlled oscillators are mixed to create a heterodyned or synthesized signal.

In prior art multi-channel equipments of the above type, two banks of crystals have been employed, the one a high-frequency bank and the other a low-frequency bank. A selector switch is ordinarily employed to select the particular channel desired. In selecting the channel, the switch, among other things, selects two crystals, one crystal from each of the high-frequency and the low-frequency bank. The two crystals selected control the tuned outputs of the high-frequency and low-frequency oscillators. The outputs of the two oscillators, the one a high-frequency signal and the other a low-frequency signal, are mixed together, ordinarily after one or both of the signals has been treated. Ordinarily, the high-frequency signal is filtered, doubled or multiplied in frequency, and again filtered. The low frequency signal is usually merely filtered. The filtered outputs of the low-frequency oscillator and of the doubler or multiplier are then mixed, for example, in a balanced mixer. The output of the mixer, which may be either a difference or a sum frequency signal, is a signal whose frequency is effectively controlled by the two crystals selected.

The present invention avoids the use of two separate banks of crystals and makes possible the use of a single bank of crystals for controlling the frequencies of operation of multi-channel equipment. For any given channel, separate crystals may control the high-frequency and low-frequency oscillators, or (at some selector settings) both the high-frequency and low-frequency oscillators may be connected to and controlled by a common crystal. This latter condition is made possible by this invention. For example, a single bank of N crystals (where N is an integer) may be used for controlling simultaneously the operation of a group of oscillators containing two times N oscillators. Each crystal of the bank may be used to control a single oscillator or may be used to control simultaneously two separate oscillators of the group operating at different frequencies. The particular two oscillators of the group controlled by a particular crystal may be changed as desired.

In many applications, a 10:1 ratio is desired between the frequency of the high-frequency oscillator and the frequency of the low-frequency oscillator. In such applications, the low-frequency oscillator may, for example, be controlled by the fundamental frequency of the crystal, while the high-frequency oscillator may be controlled by the fifth overtone of the crystal and a doubler circuit. The fifth overtone is approximately but not exactly, five times the fundamental frequency.

The present invention will be more clearly understood from a consideration of the following detailed description taken together with the drawings in which.

Figure 1:
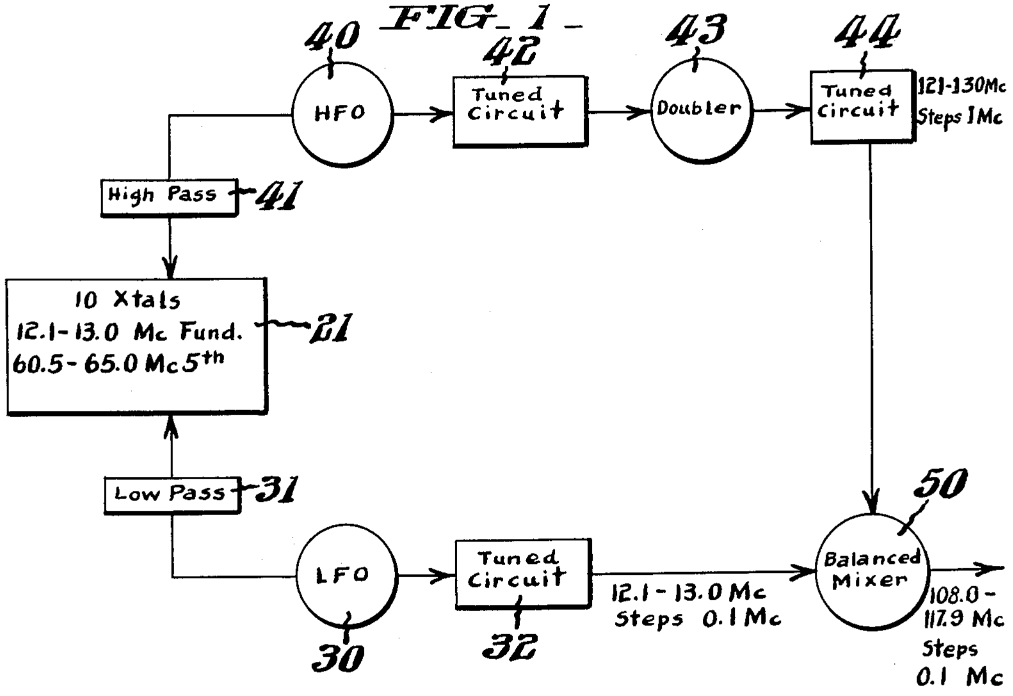
FIG. 1 is a block diagram of a portion of a multi-channel system which the present invention is employed.

Referring now to FIG. 1, a system is there shown in block diagram form in which a single bank of crystals is used to control both the high-frequency oscillator and the low-frequency oscillator. In FIG. 1, a bank of ten crystals, identified by the reference numeral 21, is illustrated whose fundamental frequencies range from 12.1 megacycles to 13.0 megacycles, the difference between the fundamental frequency of each crystal being 0.1 megacycle. The fifth overtone of these ten crystals is indicated, and is assumed to range from 60.5 to 65.0 megacycles. Actually, the fifth overtone of a crystal is not exactly five times the fundamental frequency. It has been observed, by a series of tests, that the fifth overtone is close to 5.005 times the fundamental. For convenience, in describing and claiming the present invention it will be assumed that the $n$th overtone is exactly $n$ times the fundamental.

Referring again to FIG. 1, the bank 21 of crystals there shown is employed to control the high-frequency oscillator 40 and the low-frequency oscillator 30. A high pass filter 41, and a low pass filter 31 are inserted between the bank of crystals and the high-frequency and low-frequency oscillators, respectively.

The output of the high-frequency oscillator 40 is shown to be applied to a doubler circuit 43 through a tuned circuit 42 and the output of the doubler circuit 43 is applied through a tuned circuit 44 to the balanced mixer 50. The output of the low-frequency oscillator 30 is applied to the balanced mixer 50 through a tuned circuit 32.

In the circuit illustrated in FIG. 1, the output of tuned circuit 44 are indicated to be signals ranging from 131 to 130 megacycles, in steps of one megacycle, and the output of the tuned circuit 32 are indicated to be signals ranging from 12.1 to 13.0 megacycles, in steps of 0.1 megacycle. The output of the balanced mixer 50 are indicated to be difference frequency signals ranging from 108.0 megacycles to 117.9 megacycles, in steps of 0.1 megacycle.

Figure 2:
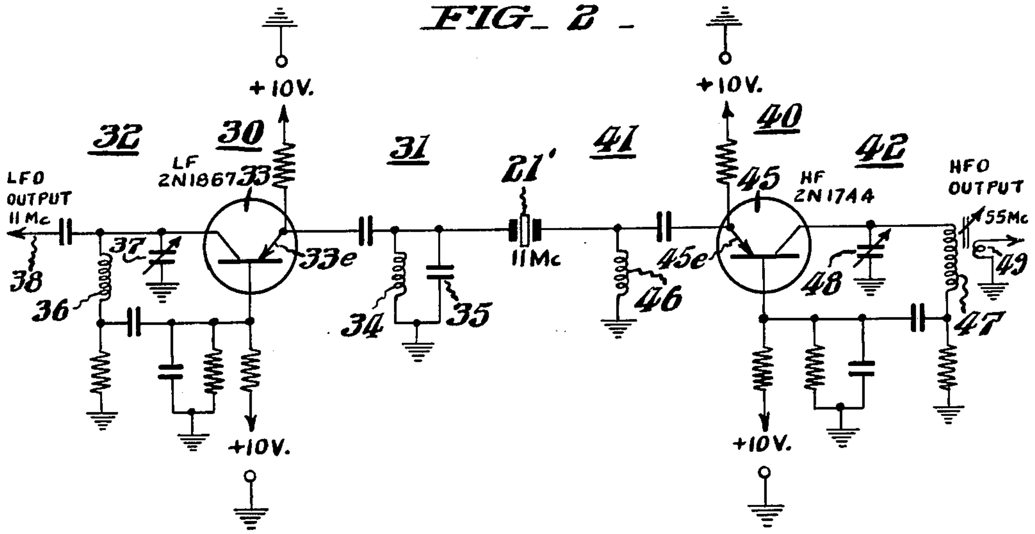
FIG. 2 is a schematic diagram of a transistor circuit illustrating a single crystal controlling simultaneously a high-frequency and a low-frequency oscillator.

FIG. 2 is a detailed schematic of a transistor circuit in which a single two-electrode piezo-electric crystal controls the frequency of two oscillators operating at widely different but related frequencies. In FIG. 2, the low-frequency oscillator 30 includes the grounded base transistor 33, indicated in the drawing as being type 2N1867. The low-pass filter 31 includes the R.-F. choke 34 (2.7 microhenries) and the R.-F. bypass capacitor 35 (47 picofarads) connected in shunt between the emitter 33*e* and ground. The tuned circuit 32 includes the inductance 36 (6.8 microhenries) and the variable capacitor 37 (5–25 picofarads).

The high-frequency oscillator 40 includes the grounded base transistor 45, indicated by being type 2N1744. The high-pass filter 41 includes the R.-F. choke 46 (0.68 microhenry) connected between the emitter 45*e* and ground. The tuned circuit 42 includes the inductance 47 and the variable capacitor 48 (5–25 picofarads).

The crystal 21′ is indicated as having a fundamental frequency of 11 megacycles. At this frequency (11 megacycles), the 0.68 microhenry R.-F. choke 46 is a low impedance connection to ground. Thus, the right electrode of crystal 21′, as viewed in FIG. 2, may be deemed to be virtually shorted to ground at the fundamental frequency of the crystal. The tuned circuit 32 comprising the 6.8 microhenry inductance 36 and the variable capacitor 37 (5–25 picofarads) is connected in the output or collector circuit of the transistor 33. The circuit 32 is tuned to 11 megacycles, the fundamental frequency of the crystal 21′.

On the high frequency side, the tuned circuit 42, which includes the slug-tuned inductance 47 and the variable capacitor 48, is tuned to the fifth overtone of the fundamental frequency, or approximately 55 megacycles. At this frequency, the R.-F. bypass capacitor 35 (47 picofarads) is a low impedance connection to ground, and thus the left hand electrode of crystal 21, as viewed in FIG. 2, may be deemed to be virtually shorted to ground at the frequency of the high frequency oscillator 40.

The 11 megacycle output of the low frequency oscillator 33 is developed across the tuned circuit 32 and appears on the lead 38, and is applied to the balanced mixer 50 of FIG. 1. The 55 megacycle output of the high-frequency oscillator 40 is developed across the tuned circuit 42, and is taken off by the pick-off coil 49 and applied to the doubler 43 of FIG. 1.

It has been determined through tests that each of the two oscillators, the low-frequency oscillator 30 and the overtone or high-frequency oscillator 40, operates independently of the other. Cut-off of the opposite oscillator has negligible effect. Shorting of the crystal input to the low frequency oscillator 30 has negligible effect on the high-frequency oscillator 40, and vice-versa.

Using a circuit such as shown in FIG. 2, frequency measurements were made on a representative quantity of crystals, with circuit 32 tuned to the fundamental and circuit 42 tuned to the fifth overtone. It was observed that the frequency of the high-frequency oscillator was closely 5.005 times the frequency of the low-frequency oscillator.

The low-frequency and high-frequency oscillator circuits illustrated in FIG. 2 are transistor circuits. These oscillator circuits could, of course, be tube circuits instead of transistor circuits, and such a tube circuit is illustrated in FIG. 3.

Figure 3:
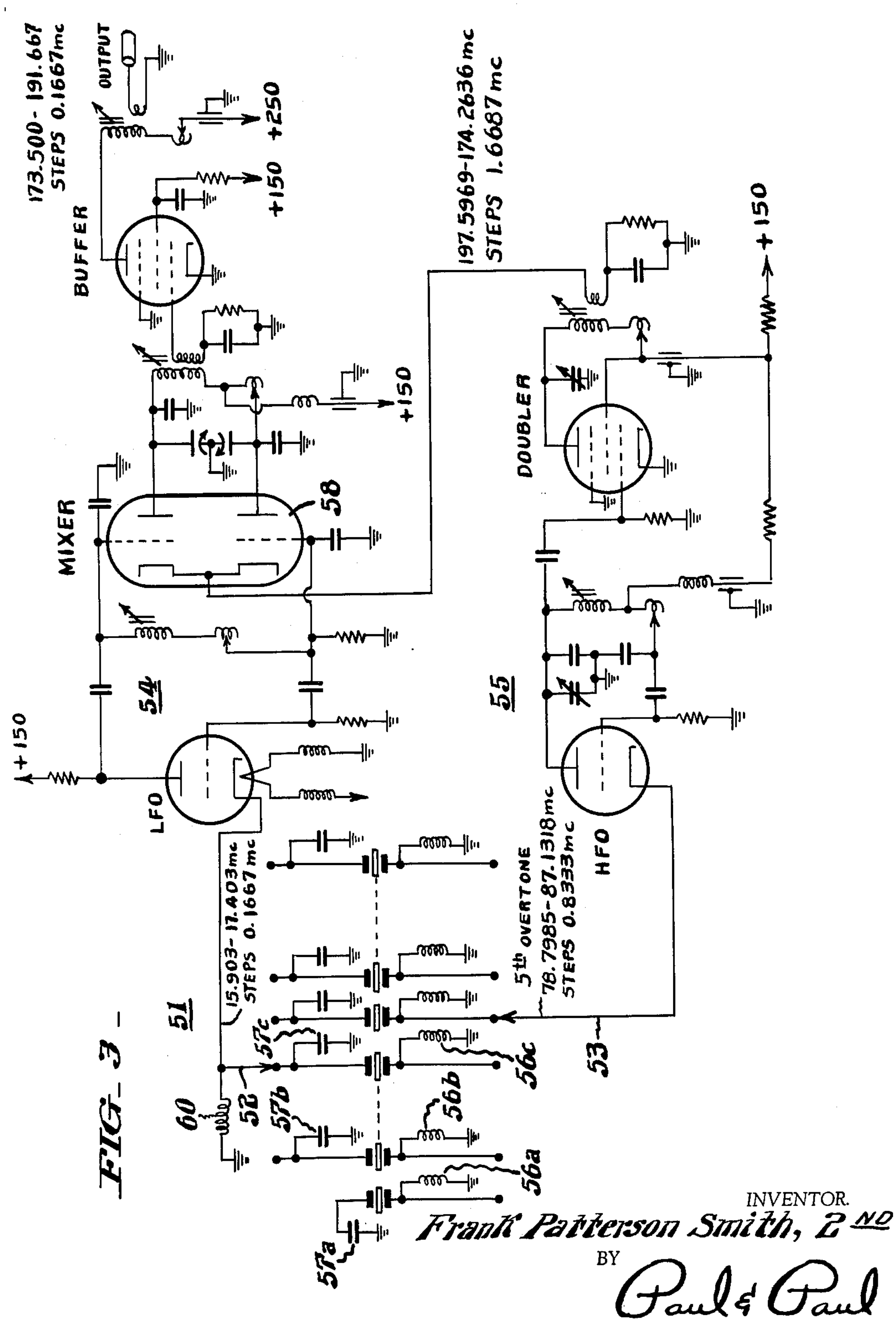
FIG. 3 is a schematic diagram of a tube circuit illustrating a single crystal controlling simultaneously a high-frequency and a low-frequency oscillator.

In FIG. 3, a bank of crystals 51 is indicated. Each crystal is connectable through selector switches 52 and 53, respectively, to a low-frequency oscillator 54 and also to a high-frequency oscillator 55. An R.-F. bypass capacitor 57*a*, 57*b*, etc. is connected to ground on the low-frequency-oscillator side of each crystal. Each of these capacitors is a low impedance at the frequencies of the high-frequency oscillator 55. An inductance 56*a*, 56*b*, etc. is connected to the ground on the high-frequency-oscillator side of each crystal. Each of these inductances is a low impedance at the frequencies of the low-frequency oscillator 54.

The high-frequency oscillator 55 shown in FIG. 3 is a capacitively-tapped oscillator circuit with the crystal inserted (in series) at the lowest impedance point (the cathode). It is necessary, in the circuit of FIG. 3, that the capacitive tap be on ground because one side of the crystal must be on ground in each oscillator circuit. The inductances 56*a*, 56*b*, etc. must then neutralize, not just crystal capacity, but all stray and tube cathode-to-ground capacity. Every effort is preferably made in the layout of the high-frequency oscillator 55 to minimize this capacity. However, since a separate choke 56*a*, 56*b*, etc. is used with each crystal, neutralization is not required over as large a frequency range and non-critical operation is readily achieved.

In the low-frequency oscillator 54, the inductance 60 neutralizes the sum of the capacitor 57 plus the crystal capacity, the stray and tube cathode-to-ground capacity. This is readily achieved since the frequency of the low-frequency oscillator is not high.

The present invention contemplates that, in the operation of the multi-channel system, each crystal could, at times, be connected to a different oscillator, while at other times each crystal would be connected to the same oscillator. When both the high-frequency oscillator 55 and the low-frequency oscillator 54 are connected to the same crystal, each oscillator operates essentially as it would without the other. In the system illustrated in FIG. 3, the high-frequency oscillator operates at the fifth overtone of the low-frequency oscillator. The fifth overtone is not exactly equal to the fifth harmonic. The difference between the fifth overtone and the fifth harmonic is referred to as the correlation offset. It may be difficult for the reader to understand how a crystal can operate simultaneously in two modes which are not exactly harmonically related. The answer is that when the crystal is properly excited by one oscillator alone the crystal does not exceed its dynamic range and may be considered to be a linear device. Thus, by superposition, simultaneous operation is possible. Mutual interference is almost entirely a function of external circuitry.

In the system shown in FIG. 3, the low-frequency oscillator 54 is generally similar to the high-frequency oscillator 55 except that the low-frequency oscillator 54 has a balanced output. A balanced mixer 58 is employed to reduce the direct high-frequency injection component.

It will be seen that in the system of FIG. 3, any one of the crystals may at any one time control a single oscillator (which may be either a low-frequency or high-frequency oscillator) or may simultaneously control two oscillators, one a low-frequency and the other a high-frequency oscillator.

While I have shown and described my invention as employing piezo electric crystals, any electro-mechanical device having mode properties could be used in lieu of the crystals.

While the preferred embodiment of this invention has been described in some detail, it will be obvious to one skilled in the art that various modifications may be made without departing from the invention as hereinafter claimed.

I claim:

1. In multiple-channel crystal-controlled equipment; a plurality of piezo-crystals substantially lesser in number than the number of channels in the equipment; two oscillation circuits having separate ranges of operating frequencies substantially different from each other; and switching means for switching each of said oscillation circuits simultaneously to a selected one or to selected ones of said crystals whereby the same crystal or different crystals control simultaneously and independently of each other said two oscillation circuits, characterized in that where the same crystal is simultaneously independently controlling said two oscillation circuits, said circuits are controlled by the fundamental and overtone modes of said same crystal.

2. In multiple-channel crystal-controlled equipment; a plurality of piezo-electric crystals; a high-frequency oscillation circuit; a low-frequency oscillation circuit; switching means for coupling said high-frequency oscillation circuit to any selected one of said crystals and switching means for simultaneously coupling said low-frequency oscillation circuit to any selected one of said crystals including the same crystal to which said high-frequency oscillation circuit is coupled to control the frequencies of said high and low frequency oscillation circuits simultaneously yet independently of each other, and characterized in that where both oscillation circuits are simultaneously yet independently controlled by the same crystal, the crystal operates in widely different frequency modes one of which is an overtone mode of the fundamental frequency mode of the crystal.

References Cited by the Examiner

UNITED STATES PATENTS

| | | | |
|---|---|---|---|
| 1,559,116 | 10/1925 | Marrison | 331—37 |
| 2,487,857 | 11/1949 | Davis | 331—131 X |
| 2,859,346 | 11/1958 | Firestone et al. | 331—37 |

FOREIGN PATENTS

| | | | |
|---|---|---|---|
| 856,638 | 11/1952 | Germany. | |

ROY LAKE, *Primary Examiner.*

J. KOMINSKI, J. B. MULLINS, *Assistant Examiners.*